(12) United States Patent
Song

(10) Patent No.: US 12,433,557 B2
(45) Date of Patent: Oct. 7, 2025

(54) SELF-SHIELDING AND MOVABLE GANTRY AND BREAST COMPUTED TOMOGRAPHY APPARATUS WITH THE SAME

(71) Applicant: DIRex Korea Co., Ltd., Goyang-si (KR)

(72) Inventor: Kichang Song, Goyang-si (KR)

(73) Assignee: DIRex Korea Co., Ltd., Goyang-si (KR)

(*) Notice: Subject to any disclaimer, the term of this patent is extended or adjusted under 35 U.S.C. 154(b) by 210 days.

(21) Appl. No.: 18/366,464

(22) Filed: Aug. 7, 2023

(65) Prior Publication Data

US 2025/0049407 A1 Feb. 13, 2025

(51) Int. Cl.
*A61B 6/50* (2024.01)
*A61B 6/00* (2006.01)
*A61B 6/10* (2006.01)
*A61B 6/42* (2024.01)

(52) U.S. Cl.
CPC .............. *A61B 6/502* (2013.01); *A61B 6/107* (2013.01); *A61B 6/4208* (2013.01); *A61B 6/4447* (2013.01)

(58) Field of Classification Search
CPC ....... A61B 1/00; A61B 6/032; A61B 1/00112; A61B 6/0435; A61B 1/00105; A61B 6/0407; A61B 6/50; A61B 6/502; A61B 6/42; A61B 6/4435; A61B 6/5211; A61B 6/03
See application file for complete search history.

(56) References Cited

U.S. PATENT DOCUMENTS

2017/0332988 A1  11/2017  Tsujii et al.

FOREIGN PATENT DOCUMENTS

| JP | 2015-097691 | 5/2015 | |
|---|---|---|---|
| KR | 10-2017-0029370 | 3/2017 | |
| KR | 20220109600 A | * 1/2021 | ............... A61B 6/56 |

* cited by examiner

*Primary Examiner* — Don K Wong
(74) *Attorney, Agent, or Firm* — Bridgeway IP Law Group, PLLC; Hyun Woo Shin

(57) ABSTRACT

Disclosed is a self-shielding and movable gantry and a breast computed tomography apparatus with the same, in particular, in which the BCT can be freely installed and moved through its own X-ray shielding, which enables examinations with no physical or clinical limitations through a full three-dimensional isotropic image of a breast without compressing the breast, does not require complementary examinations such as MRI or ultrasound, allows for a comfortable, accurate and versatile examination with the minimum face-to-face and contact, and the use of the taken images can be maximized along with AI.

9 Claims, 6 Drawing Sheets

SELF-SHIELDING AND MOVABLE GANTRY AND BREAST COMPUTED TOMOGRAPHY APPARATUS WITH THE SAME

BACKGROUND OF THE INVENTION

Field of the Invention

The disclosure relates to a self-shielding and movable gantry and a breast computed tomography apparatus with the same, and more particularly to a self-shielding and movable gantry, which has a box-shaped enclosed structure for a low radiation exposure dose to restrict generated X-rays to the inside thereof, is movable, and guides a subject based on its own weight to minimize change in the shape of the subject, and a breast computed tomography apparatus including the same.

Description of the Related Art

In general, a mammography apparatus employs X-rays to early diagnose breast cancer. In other words, a certain amount of X-rays are transmitted to a breast of an examinee, and the transmitted X-rays are digitally obtained as a two-dimensional image through a photosensitive film or an electric image sensor. The mammography apparatus has a structure that a compression member for compressing a subject including breast is positioned between an X-ray generator and an X-ray detector in order to improve image quality and reduce a required dose.

However, the structure of the mammography apparatus using the compression member for compressing the breast to improve the image quality and reduce the radiation exposure dose often causes a patient to feel pain and an obtained image to be deformed.

Further, in the case of diagnosing an implanted breast, there are limitations on imaging, increase in doses, and side effects such as the rupture of implants.

In addition, in the case of diagnosing an operated breast, it is difficult to perform postoperative monitoring for a lesion because the operated breast should not be compressed.

In particular, the related art has difficulty in accurately measuring the volume of a lesion, and it is thus difficult to perform monitoring for neoadjuvant chemotherapy that requires accurate measurement of volume change. Further, the related art has fundamentally inadequate performance and functionality, such as difficulty in determining the extent of disease (breast imaging-reporting and data system, BIRADS), and need to view and diagnose a three-dimensional subject in two dimensions.

In addition, in the case of dense breasts of which the structures below are obscured by the structures above, there is an inconvenience that the probability of false negatives and false positives is high.

On the other hand, a breast computed tomography apparatus (BCT) is structured not to require the compression of the breast, thereby causing no side effects such as pain, comfortable examination regardless of operation or plastic surgery, and accurate examination based on full three-dimensional view regardless of the density of the breast. Further, the BCT makes it easy to perform the postoperative monitoring, monitor the neoadjuvant chemotherapy, and determine the extent of disease (BIRADS).

Further, the BCT has no clinical limitations due to physical characteristics of modality itself (for reference, it is difficult for ultrasound or magnetic resonance imaging (MRI) to detect microcalcification, which is one of indicators for early breast cancer), and does not require complementary examination for dense breast, thereby having advantages of minimizing face-to-face and contact.

In the BCT, positioning is based on only gravity, and lymph nodes are easily observed without limitations on diagnosis areas from a nipple to a chest wall, thereby making it easy to identify whether metastasis has occurred.

Further, in particular, the BCT has an advantage of readily utilizing a permanent and perfect artificial intelligence (AI) platform that has no clinical and physical limitations, for an AI diagnosis which is expected to be applied to all diagnoses in the future, especially in mobile environment.

However, even the BCT having the aforementioned advantages still requires generally more X-ray doses than the mammography apparatus, and also needs to basically shield all six sides of the hexahedron in the facilities because of a high leakage of X-ray doses (usually, four sides are shielded except upper and lower sides because concrete is thickly used between floors). The conventional BCT should be installed only in a shielded room, limits the use of a space due to installation area and lead plate shielding issues, and is hard to avoid excessive installation time, costs and environmental pollution.

In addition, the BCT has advantages over the mammography apparatus and is thus very useful in various places such as radiology departments, examination centers, breast surgery, cancer centers, operating rooms, and in particular ambulatory care. However, the BCT having a stationary structure is inconvenient to move when needed, and makes it difficult to use a space and reduce installation costs.

SUMMARY OF THE INVENTION

An aspect of the disclosure is to provide a self-shielding and movable gantry, which can be miniaturized, generates a low dose of X-rays, and is easy and convenient to block the generated X-rays, and a breast computed tomography apparatus (BCT) including the same, which has many advantages in breast diagnosis among all X-ray diagnostic apparatuses.

Further, another aspect of the disclosure is to provide a self-shielding and movable gantry, which can be installed or moved freely and make the best use of a space, and a breast computed tomography apparatus including the same.

Further, still another aspect of the disclosure is to provide a self-shielding and movable gantry, which can be lightweight and miniaturized to reduce energy consumption and increase economic efficiency, and can be freely moved to make better use of a space, and a breast computed tomography apparatus including the same.

The aspects of the disclosure are not limited to those mentioned above, and other unmentioned aspects and advantages of the disclosure can be understood from the following description and will be more clearly understood from the embodiments of the disclosure.

According to an embodiment of the disclosure, there is provided a gantry including: a frame shaped like a box and having an interior formed with a space; a rotary gear rotatably coupled to the interior of the frame; a low-dose subminiature nano cold-cathode field-emission digital X-ray tube coupled to a first side of the rotary gear and generating X-rays based on high voltage applied thereto; and a perovskite type high-sensitive low-dose X-ray detector coupled to a second side of the rotary gear, receiving the X-rays generated from the X-ray tube and transmitted through a subject, converting the received X-rays into an electrical signal, and transmitting the electric signal to a data collector, wherein the rotary gear is movable up and down or left and right with respect to the frame, the X-ray tube and the X-ray detector are disposed symmetrically with respect to a rotational center axis line to maintain a relative position therebetween, and the frame includes an opening on the second side thereof to insert the subject therein, and the frame includes a shield on an entire inner surface thereof to shield against the X-rays generated by the X-ray tube.

Further, the shield may include a lead plate.

Further, the subject may include a breast.

Further, the frame may include a tilting structure to be tiltable and adjustable in height with respect to a horizontal plane, and the frame may couple with a supporting unit for supporting a human body including the subject such that the subject in the opening can be maintained downwardly by its own weight.

Further, the gantry may further include a transporter including wheels on a lower side of the frame such that the frame can move.

According to an embodiment of the disclosure, there is provided breast computed tomography apparatus including: the foregoing gantry; a controller including a control console for allowing a user to make an input, and configured to control the X-ray tube, the X-ray detector, and the data collector; an image display configured to display an image; an X-ray power supply configured to generate a high voltage and supply the high voltage to the X-ray tube under control of the controller; and an image reconstructor configured to calculate a pixel value of an image formed based on data from the data collector and transmit the calculated pixel value to the image display, wherein the subject is positioned in the opening, and the controller controls the X-ray tube to generate the X-rays and the rotary gear to rotate, and the X-ray tube is rotated along the subject positioned proximate to a rotational center axis line of the rotary gear, the X-rays generated by the X-ray tube is transmitted through the subject, received in the X-ray detector, and transmitted to the image reconstructor via the data collector, and the image reconstructor calculates a pixel value for an image based on data of the data collector and transmits the calculated pixel value to the image display.

Further, a difference between the pixel values may be obtained by comparing pixels in images taken before and on a reference date, and the difference between the pixel values may be obtained by shifting the pixels while comparing both the images or including a group of pixels bundled by binding multiple pixels.

DETAILED DESCRIPTION OF THE INVENTION

Below, a self-shielding and movable gantry and a breast computed tomography apparatus 100 with the same (hereinafter referred to as a 'breast computed tomography apparatus') according to an embodiment of the disclosure will be described in detail with reference to FIGS. 1 to 6.

Figure 1:
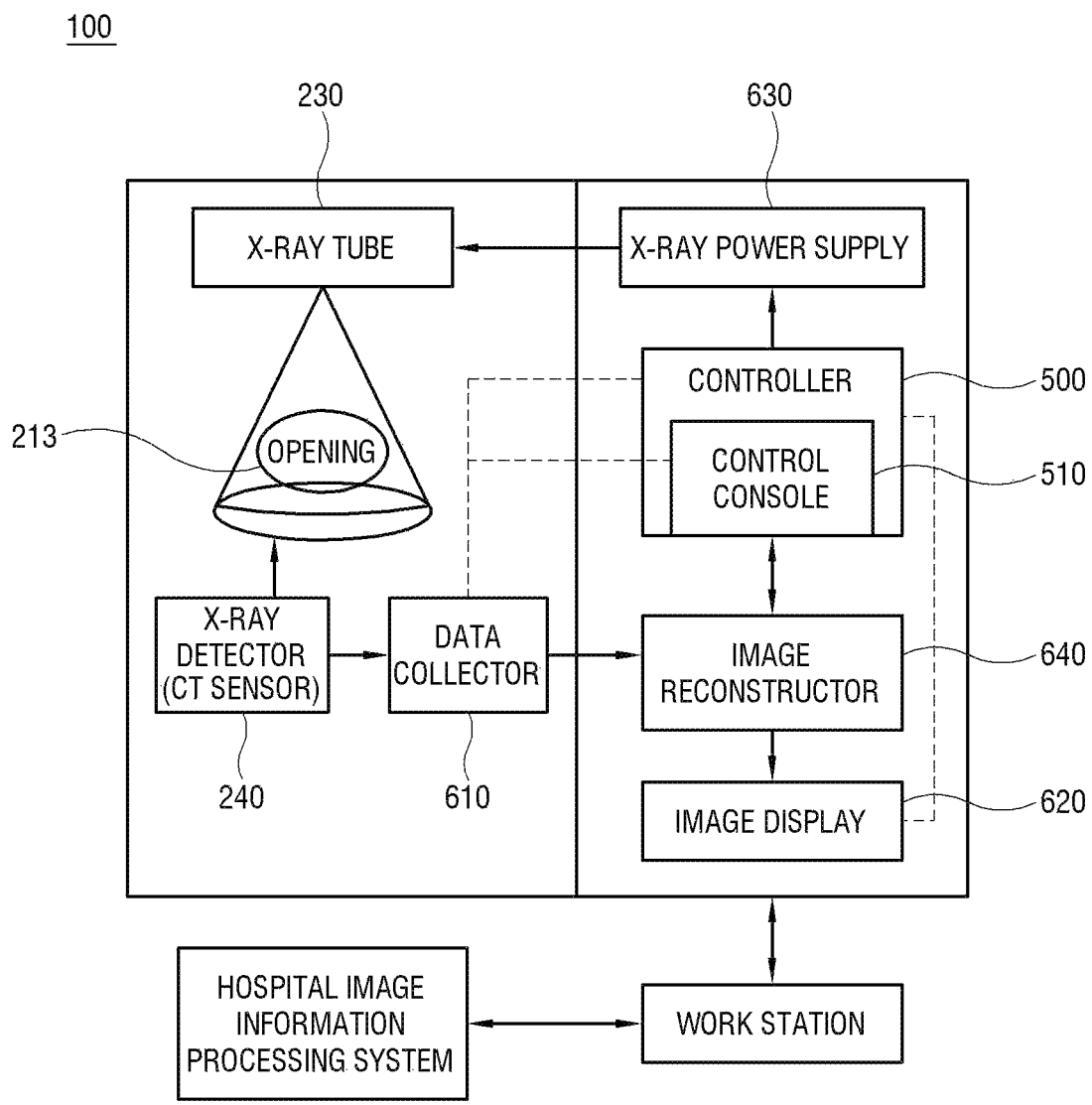
FIG. 1 is a diagram conceptually illustrating a breast computed tomography apparatus according to an embodiment of the disclosure.
Figure 2:
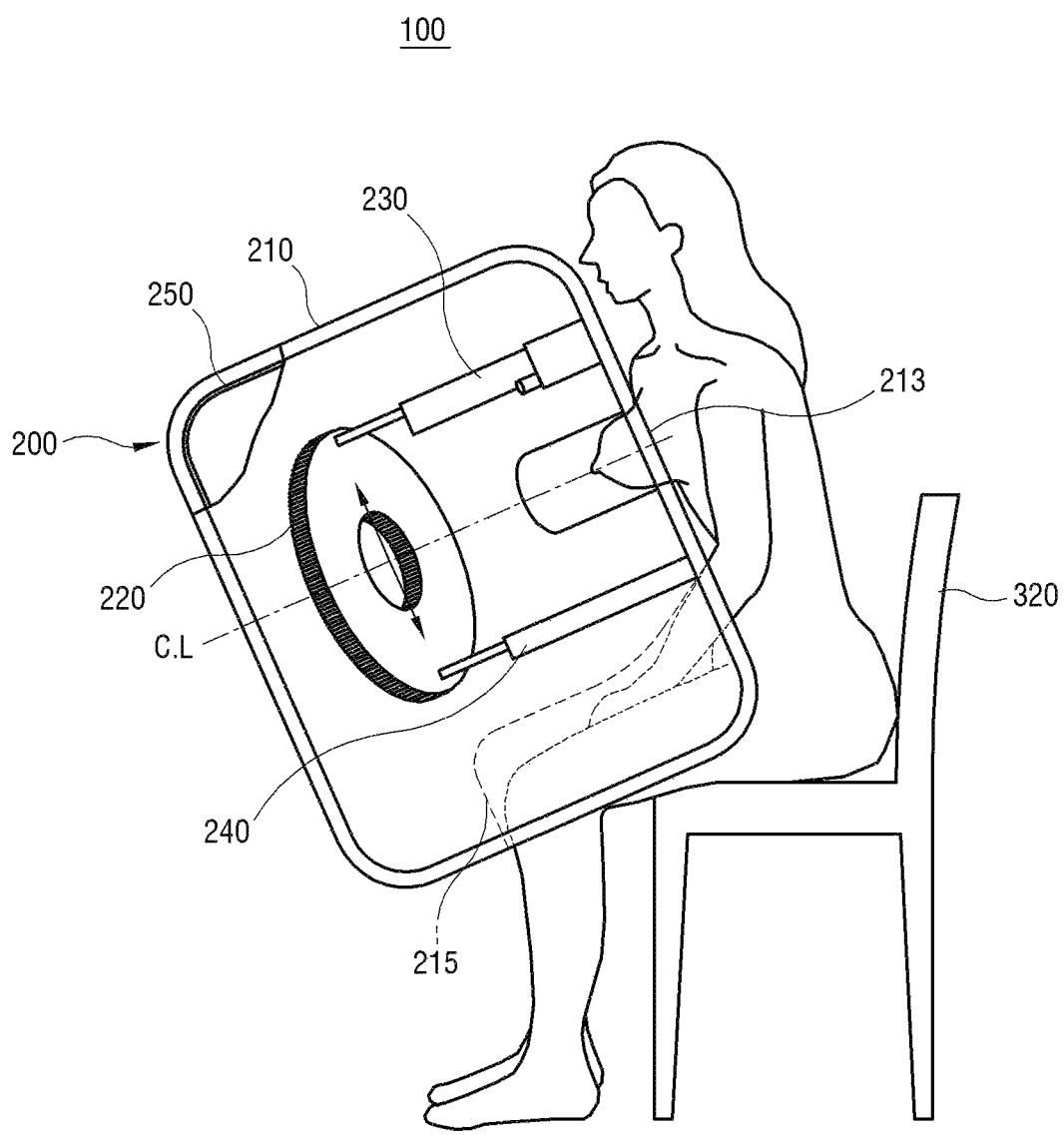
FIG. 2 is a schematic perspective view for illustrating the breast computed tomography apparatus of FIG. 1.
Figure 3:
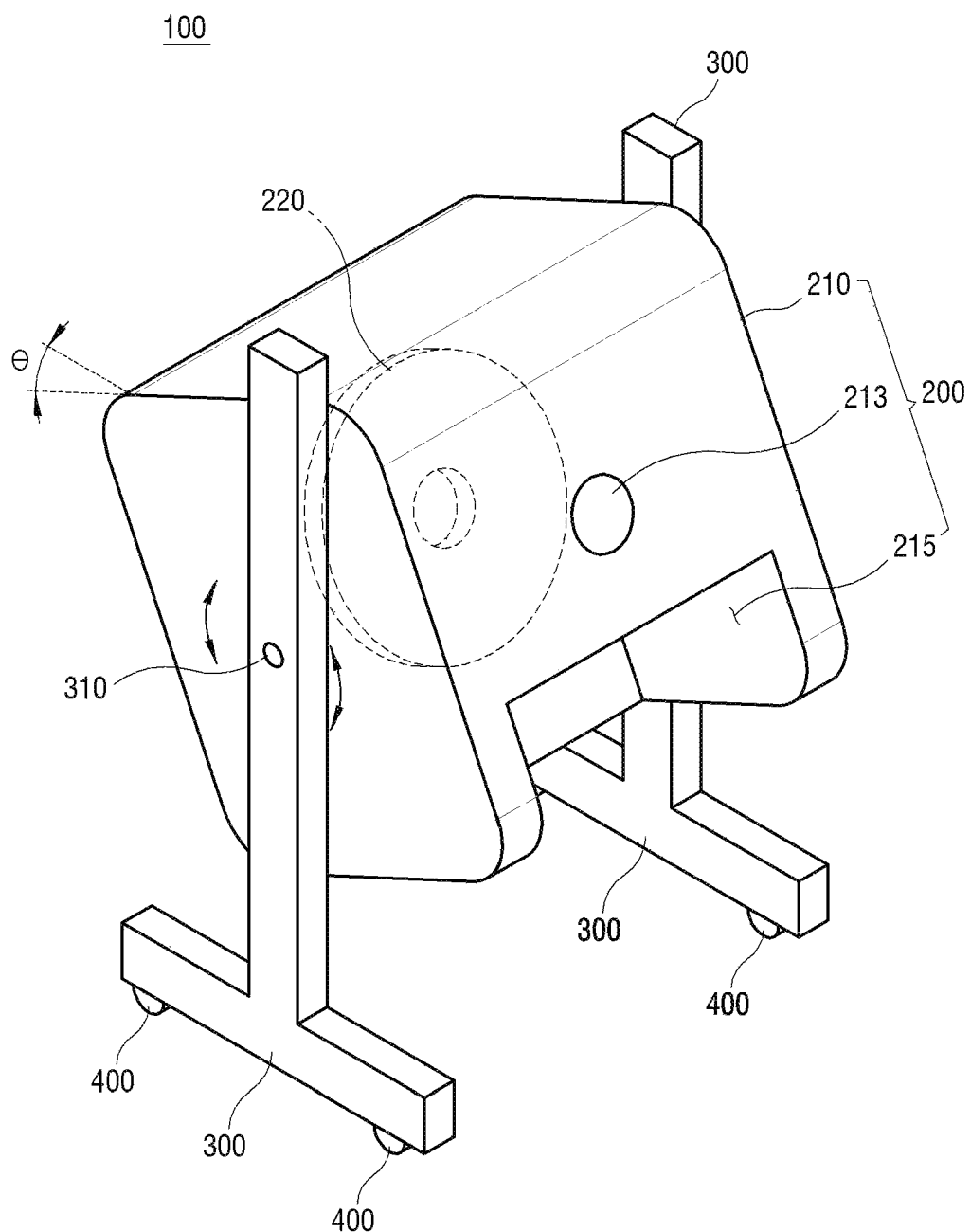
FIG. 3 is a conceptual diagram for illustrating a process of taking an image in FIG. 2, FIGS. 4 to 6 are conceptual diagrams for illustrating a process for determining a pixel value.

FIG. 1 is a diagram conceptually illustrating a mammography apparatus according to an embodiment of the disclosure, FIG. 2 is a schematic perspective view for illustrating the mammography apparatus of FIG. 1, FIG. 3 is a conceptual diagram for illustrating a process of taking an image in FIG. 2, and FIGS. 4 to 6 are conceptual diagrams for illustrating a process for determining a pixel value.

The breast computed tomography apparatus 100 according to the disclosure may, as shown in FIGS. 1 to 3, include a frame 210 shaped like a box and having an interior formed with a space; a rotary gear 220 rotatably coupled to the interior of the frame 210; a low-dose subminiature nano cold-cathode field-emission digital X-ray tube 230 coupled to a first side of the rotary gear 220 and generating X-rays based on high voltage applied thereto; and a perovskite type high-sensitive low-dose X-ray detector 240 coupled to a second side of the rotary gear 220, receiving the X-rays generated from the X-ray tube 230 and transmitted through a subject, converting the received X-rays into an electrical signal, and transmitting the electric signal to a data collector 610, in which the rotary gear 220 is movable up and down with respect to the frame 210, the X-ray tube 230 and the X-ray detector 240 are disposed symmetrically with respect to a rotational center axis line to maintain a relative position therebetween, the frame 210 includes an opening 213 on the second side thereof to insert the subject therein, and the frame 210 includes a shield 250 on an entire inner surface thereof to shield against the X-rays generated by the X-ray tube 230.

In addition, the breast computed tomography apparatus 100 may further include a supporter 300 and a transporter 400.

In addition, the breast computed tomography apparatus 100 may further includes a controller 500 with a control console 510, an image display 620, an X-ray power supply 630, and an image reconstructor 640.

A gantry 200 may, as shown in FIGS. 2 and 3, include the frame 210 where the X-ray tube 230 and the X-ray detector 240 are coupled to obtain a medical image, and the supporter 300 having a tilting unit 310 to adjust the height of the frame 210 or tilt the frame 210.

Although it is illustrated that the X-ray tube 230, the X-ray detector 240 and the data collector 610 are coupled to the interior of the frame 210 of the gantry 200, an element including the controller 500 may also be coupled as necessary.

The rotary gear 220 is shaped like a plate, so that the X-ray tube 230, the X-ray detector 240, and the rotary gear 220 can be coupled. The rotary gear 220 may be shaped like a disc and rotatable, and the rotational speed of the rotary gear 220 may be controlled by a speed reducer including a motor (not shown) under control of the controller 500.

The gantry 200 shaped like a square box includes the opening 213 through which a user's subject, i.e., a breast is positioned, and a recessed portion 215 recessed to accommodate a user's arms, legs, and the like.

The gantry 200 is provided with the shield 250 for shielding against the X-rays on the entire inner plate surface thereof (more specifically, referred to as the frame 210). The shield may block the X-rays generated by the X-ray tube 230 and radiated into the gantry 200, thereby preventing the X-ray from leaking out of the gantry 200. The shield 250 protect an examinee, a person controlling the apparatus, and people around the apparatus from the X-rays.

The shield 250 may be achieved by bonding the lead plate to a plate surface inside the gantry 200 except the opening 213, or by coating or attaching a barium or other alloy to the inner surface of the gantry 200.

Meanwhile, the shield 250 may be formed not on the entire inner surface of the gantry 200 but only on a surface to be highly irradiated with the X-rays in consideration of the amount of X-ray irradiation, and may be varied in thickness depending on the amount of X-ray irradiation.

The gantry 200 may be provided with a supporting unit 320 shaped like a chair and firmly supported on the boxy shape so as to assist a user in inserting a breast in the opening 213 and being positioned in the recessed portion 215. Here, when the gantry 200 is tilted with respect to the floor (see 'O' in FIG. 3) while a user is sitting on the supporting unit 320, a user is also tilted together with the supporting unit 320 because the supporting unit 320 is fixed to the gantry 200. In this case, a user may be secured to the supporting unit 320 by a belt or the like to prevent the subject from moving in the opening 213.

In addition, the transporter 400 including wheels is coupled to a lower side of the supporter 300 so that the supporter 300 can be transported.

The fundamental principle of the disclosure is based on the prediction of the Austrian mathematician Radon that a clear tomographic image can be reconstructed by obtaining projection (transmission) data from multiple directions. The projection (transmission) data refers to data obtained by converting the dose of X-rays transmitted through a human body into electrical intensity in the X-ray detector that detects the X-rays irradiated at various angles (e.g., 360 degrees) and transmitted through the human body.

To convert the electrical intensity into pixel values (i.e., a tomographic image), a computational equation should be solved. With development of a computer that can perform computations in a short period of time, a system for the conversion has been realized, which is called a computed tomography apparatus.

The X-ray tube 230 refers to a vacuum tube that generates X-rays. In the X-ray tube 230, a direct current (DC) of about 100,000 volts is applied between a cathode and an anode, and electrons generated from the cathode are attracted to the anode and collide with the anode, thereby converting the kinetic energy of the electrons into another form, i.e., the X-rays.

By measuring a test X-ray generated by the X-ray tube 230 and feeding the measured X-ray back to an X-ray power supply 630, it is possible to perform precise dose adjustment, automatic dose control, and protocol-type irradiation, which are controlled through the controller 500.

The X-ray tube 230 may include a new concept digital X-ray tube, which is the most efficient in dose, has a compact size, easily generates the short and intense pulses of the X-rays, and precisely controls energy and dose.

Further, the X-ray tube 230 may include a nano cold-cathode field-emission type digital X-ray tube, which easily generates short and strong X-rays for excellent image quality while minimizing a required X-ray dose, precisely controls the energy and the dose, and is subminiaturized by eliminating the need to heat the cathode and thus eliminating a heating circuit.

The X-ray detector 240 detects the X-rays generated from the X-ray tube 230 and passed through the subject, converts the detected X-rays into electrical intensity, and transmits information about the electrical intensity to the data collector 610. In other words, the X-rays irradiated from the X-ray tube 230 transmits the breast of the examinee inserted in the opening 213 and reaches the X-ray detector 240 at an opposite position to the X-ray tube 230 along the rotational center axis line (see 'C.L.' in FIG. 2).

The X-rays generated from the X-ray tube 230 may be irradiated while rotating the rotary gear 220 360 degrees around the breast, and the transmittance of the X-rays transmitted in each direction may be converted into electrical intensity by the X-ray detector 240.

The X-ray detector 240 includes hundreds of semiconductors in each row.

To generate the X-rays with transmittance power, the electrons are accelerated by about 100,000 volts and collide with the anode, so that the electrons can be braked and their kinetic energy can be converted into another form of energy, i.e., X-rays, which is called braking radiation (more than 90% of the total generated X-ray dose). In addition, electrons collide with each other to be excited to angles different in energy level and then return to their original state, thereby generating some characteristic radiation (at a specific frequency band) due to energy difference. The combination of the braking radiation and the characteristic radiation is called the generated X-rays. The X-rays are processed into a form that is as narrow and strong as possible (with increased average energy) in the spectrum displayed with the frequency band as the x-axis and the dose as the y-axis.

The X-ray tube 230 is required to generate X-rays that only benefit the image quality while reducing the radiation exposure to a patient as much as possible, and it is necessary to process the generated X-rays. As described above, the X-ray detector 240 serves to measure a value of the transmitted X-ray dose and transmit that value to the data collector 610.

The data collector 610 serves to collect and arrange the values received from the x-ray detector 240 in each direction, and transmit the values to the image reconstructor 640.

As described above, the X-ray tube 230 requires a strong and high (DC) voltage.

The X-ray power supply 630 boosts general power to a high voltage, rectifies the high voltage into a DC voltage, and supplies the high DC voltage to the X-ray tube 230 that requires the high DC voltage, and the level of the high DC voltage may vary depending on the X-ray dose required to be generated. The X-ray power supply 630 is capable of accurate dose control, automatic exposure adjustment, automatic adjustment according to protocol, etc. based on the feedback of the X-ray dose, and such control or adjustment is performed by the controller 500.

The controller 500 may perform various functions, including controlling and adjusting the configuration according to the disclosure.

The image reconstructor 640 computes the data received from the data collector 610 to determine each pixel value. The image reconstruction is a mathematical process of generating an image based on raw data, i.e., the data recognized by the X-ray detector 240 and collected and transmitted by the data collector.

By obtaining the transmission values in each direction for each X-ray detector 240 (referred to as 'data collection') and calculating the pixel values in the form of a matrix (referred to as 'image reconstruction'), it is possible to view a tomographic image itself or a three-dimensional image based on collection of many tomographic images.

Figure 4:
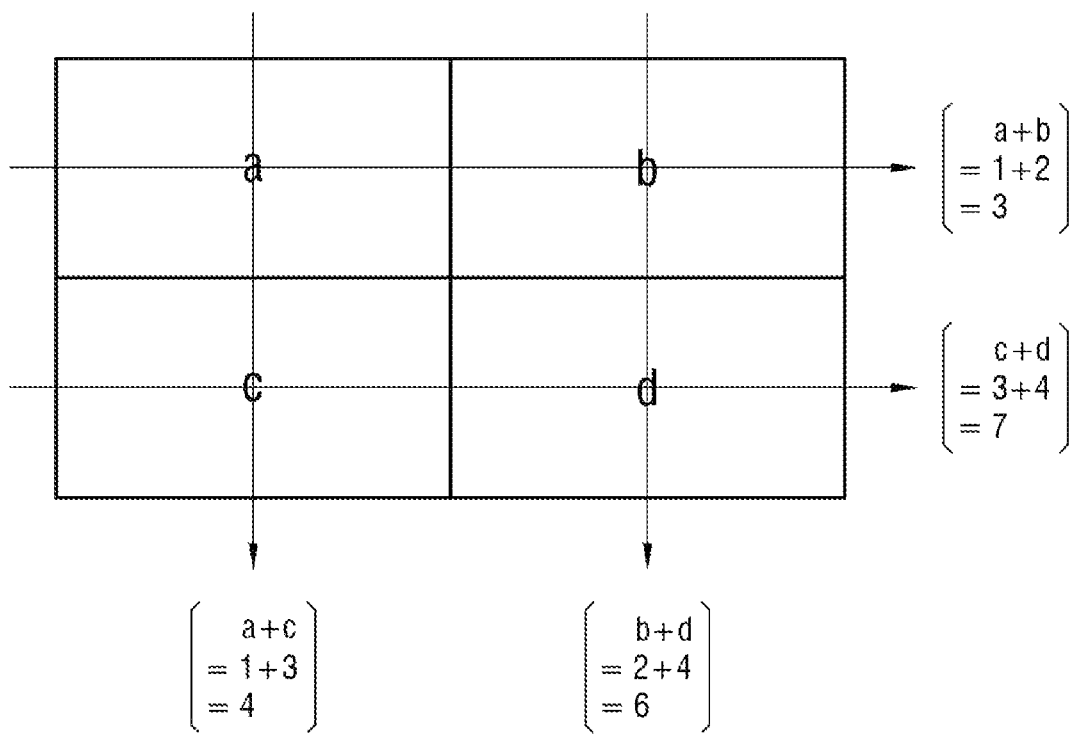

According to the principle shown in FIG. 4, the values of $a=1$, $b=2$, $c=3$, and $d=4$ can be obtained from the horizontal sums $a+b=3$ and $c+d=7$ and the vertical sums $a+c=4$ and $b+d=6$ in each pixel. In this way, it is possible to obtain each pixel value from the data, but a very large number of equations need to be quickly calculated to determine a very large number of pixel values, which is possible only when computers with high computational speed are sufficiently developed.

The image reconstructor 640 may also be implemented to have a function of the controller 500. The performance may be improved by using a better technique (e.g., an iterative reconstruction algorithm) than a conventional filtered back projection (FBP) as an analysis method. Such an algorithm is very excellent in converting an image electrical signal into pixel values in three-dimensional coordinates, and therefore high image quality is obtained with compressed noise. Accordingly, the required dose is additionally reduced.

The image display 620 displays a tomographic image or a three-dimensional stereoscopic image based on superimposed tomographic images as a result of the output from the image reconstructor 640. The image display 620 may also make it possible to simultaneously monitor all the acquired images. In this way, multiple organically connected control elements may be displayed, thereby facilitating control of the entire apparatus.

The control console 510 may include a touch panel, a keyboard, a mouse, and a track ball, and may allow a user to make necessary inputs to control the images and the gantry 200 in a scan mode.

To efficiently control spiral rotation for improving a signal-to-noise ratio based on data deviations, communication between the data collector 610 and the control console 510 may also be controlled by the controller 500.

With this configuration, the operation process of the breast computed tomography apparatus 100 will be described below in detail.

First, an examinee sits on the supporting unit 320 of the supporter 300 and positions a subject, i.e., a breast in the opening 213.

The X-ray power supply 630 boosts and rectifies general power or voltage charged in a battery, and applies a high voltage, which has been processed by a pulse method according to conditions for generating X-rays, to the X-ray tube 230. Thus, X-rays are irradiated from the X-ray tube 230.

The generated X-rays are irradiated being rotated 360 degrees around the subject, i.e., the breast by the rotation of the rotary gear 220.

The X-rays transmitted through the breast are received in the X-ray detector 240 and converted into electrical intensity corresponding to their doses. The data collector 610 arranges the data converted into the electrical intensity in each direction, i.e., by the X-ray detector 240 and transmits the arranged data to the image reconstructor 640, and the image reconstructor 640 calculates the received data into pixel values to generate a tomographic image.

The obtained tomographic images are displayed on the image display 620 and read directly, or transmitted to and stored in the entire computer system of hospital and loaded when needed by a doctor or department.

All of these processes are carried out through the controller 500, which are controlled as a doctor or authorized user inputs commands through the control console 510.

Here, an image taking process starts by positioning the breast. When the subject is positioned in an image taking position by gravity alone, which is the characteristics of breast computed tomography apparatus (BCT) according to the disclosure, a very wide image taking area (coverage) encompassing lymph nodes is secured structurally (with the help of gravity), and it is thus rapidly identified whether metastasis has occurred. Further, it is possible to detect parenchymal changes in units of pixels, almost in units of cells, thereby enabling precise treatment.

In other words, the breast computed tomography apparatus (BCT) according to the disclosure may employ three-dimensional pixel (volume pixel, voxel) shift and digital subtraction software because of not only its own advantages but also the positioning based on only gravity which is always in the same direction regardless of time and space. As a result, it is not only possible to establish a system for early detection, diagnosis, and tracking, observation and management of parenchymal changes in tissue cell units of breast cancer, but also to overcome operational limitations such as technical and scientific limitations and lack of infrastructure of medical artificial intelligence (AI) using this system, thereby causing improved functions and maximum utilization of the AI.

When the breast tomography apparatus 100 according to the disclosure takes images to diagnose the breast cancer, it is structurally possible to obtain the images of the breast in almost the same form each time because only gravity, which is always constant regardless of time and place, acts on an imaging target, i.e., the breast. Therefore, by using the voxel shift software, it is easy to match all the coordinates of the voxels, the size of which approximates the size of a tissue cell, in tomographic images (which becomes a three-dimensional image when put together), with those of the previous image. Further, by applying the digital subtraction software between to the voxels of the same coordinates in images before and after an image taking date, it is possible to obtain change in each voxel value as a parenchymal value in a consistent unit (i.e., a unit called a "Hounsfield unit" for an attenuation value of the X-rays).

Therefore, the breast parenchymal changes in the early microscopic stage are very rapidly detected and accurately diagnosed, and it is thus possible to track the progression of tissue changes, thereby enabling the management of the breast cancer in the tissue cell units. In addition, this is not a general and schematic application of AI, but a technology application specific to the breast cancer diagnosis, which will be expected to overcome the current scientific and technical limitations, and the lack of infrastructure of the breast cancer diagnostic AI and to be used significantly throughout the breast cancer in the future. In addition, it will be possible to maximize the use of AI, which will be more useful for a mobile diagnostic breast computed tomography apparatus.

Further, in the operation process of the breast computed tomography apparatus 100 according to the disclosure, the less a motion artifact, the shorter the rotational X-ray generation. That is, the faster the rotation scan, the less the motion artifact.

Further, the rotary gear 220 may move up and down during scanning to obtain deviated image data and superimpose the obtained data. In other words, in a scan mode, signals deviated by multiple scanning times as quickly as possible with an adjustable scan pitch may be superimposed, thereby obtaining a superior quality image with a better signal-to-noise ratio (s/n ratio), and having an effect on further reducing the required dose.

In addition, the breast is irradiated with the X-rays while the rotary gear 220 rotates 360 degrees, and thus the images may be obtained based on the X-rays transmitting a lesion area at all angles of the breast.

Basically, by rotating the rotary gear 220 once, an image of the lesion area is obtained at all angles of the breast. However, the rotation of the rotary gear 220 may be repeated several times to get the clearest image.

The X-rays generated at this time propagate in a radial direction, and all but the X-rays that reach X-ray detector 240 are unnecessary and harmful to a human body. These X-rays belong to radiation that is harmful to the human body. Therefore, when only safety to the human body is taken into account, the less the amount of X-rays used and leaked, the better. Apart from the examinee, the radiation exposure of the X-rays to a system operator or the like is required to be reduced. It is therefore important to block the X-rays not to propagate outwards. This blocking is accomplished by the shield 250 described above, in particular, to ensure that a leakage X-ray dose is below a threshold (domestic standard: 2.58 C/kg or 100 mR per week). To this end, the disclosure provides the shield 250 for X-rays, which is formed on the inner surface of the frame 210 of the gantry 200 and has a structure capable of shielding against X-rays leaking to the outside.

Meanwhile, the smaller the amount of X-rays generated and emitted from the X-ray tube 230, the smaller the amount of X-rays reaching the X-ray detector 240 and the less likely it is to obtain a clear image. Therefore, to obtain the clear image, the X-ray power supply 630 needs to generate and apply a high voltage to the X-ray tube 230 and generate a large amount of X-rays. The X-rays may be processed (or filtered) to reduce the radiation exposure dose while improving the image quality and, but there is still a large amount of X-rays that may leak to the outside and cause harm to the human body.

According to the disclosure, new technologies are applied to reduce the required X-ray dose (active shielding), and the X-ray shield 250 is formed on the inner surface of the frame 210 (passive shielding), thereby promoting the safety of the human body.

The breast computed tomography apparatus 100 shields its own X-rays internally, and is thus not necessary to install X-ray shielding for the entire exterior wall of a room where the system is installed. Therefore, it is possible to install the breast computed tomography apparatus 100 anywhere as long as there is a lightweight shielding partition.

Further, according to the disclosure, a high-sensitive X-ray detector 240 may be used to obtain high-resolution images with a small amount of X-rays (active shielding). This may be accomplished by using a perovskite-type X-ray detector, which has significantly better sensitivity than a conventional X-ray detector and results in significantly reducing the required dose, or the like X-ray detector having the same performance.

The perovskite type X-ray detector 240 is highly desirable for human body protection of a patient or surrounding people because its sensitivity is higher 20 times and its required X-ray dose is lower by ¹⁄₁₀ than those of a conventional detector.

The frame 210 according to the disclosure employs the high-sensitive X-ray detector 240, and it is thus possible to use a cold-cathode miniaturized X-ray tube having a small capacity, thereby enabling the entire system to be lightweight and compact while requiring less energy.

By forming the shield 250 on the inner surface of the frame 210, the X-rays are less likely to harm the human body. Further, the gantry 200 may be combined with the transporter 400, which includes wheels, to improve mobility and facilitate installation. The movable gantry 200 makes it possible to visit and radiograph a patient who has difficulty in coming to a hospital, such as a patient in a rural area.

According to the disclosure, all the dose reduction elements are combined to significantly reduce the dose, and passive shielding inside the frame 210 significantly reduces the radiation exposure dose or the risk of radiation exposure to a patient and surrounding people, thereby minimizing energy consumption requirements, facilitating mobility, and maximizing utilization.

Meanwhile, diagnosis based on human vision is subject to errors, and AI diagnosis is being utilized to compensate for the error. However, the AI diagnosis may have clinical, technical, scientific, and operational limitations in the current diagnostic situation, which is based on two-dimensional images, or depends on devices with physical and clinical limitations even in the case of three-dimensional images, or relies on inconsistent diagnostic information with insufficient clinical studies.

In this regard, Google cited a general and chronic lack of clinical research, technical and scientific limitations, and lack of infrastructure as important factors that currently make it difficult to apply AI technology to healthcare, based on a detailed analytical paper that diagnoses the current level of medical AI in the healthcare and integrates the introduction in the medical field, etc.

In addition, the variability of medical data used in training the AI is also a problem. The data varies depending on the gender and age of a patient, data generation conditions, the medical environment, and time. Therefore, it is difficult for the AI to generalize the data, and it is thus difficult to consistently standardize the self-learning data. Accordingly, to make AI that can be introduced to the medical field, further development is still needed.

To this end, if actual data specific to each diagnosis can be provided, it is expected that generalized review by experts with clinical data based on consistent evaluation indicators will be more easily and actively carried out. Further, if actual important information that is not affected by accidental variables is provided, it is expected that consistent generalization can be made, necessary infrastructure will be easier to build, and the evaluation and management of constantly changing AI will be consistent.

In addition, there are currently few methods that can provide a complete diagnosis at the first time, and there are currently few suitable methods to track, observe, or manage cancer detected in units of tissue cell by visual diagnosis using all methods. However, all of the above methods will be possible in the future if changes in tissue cells are immediately identified.

However, the reason why it is currently difficult to detect changes in these tissue cells is that even though there is a technology called digital subtraction for detecting changes, almost all of the breast cancer diagnostic systems for looking inside the breast have physical and clinical limitations and it is not possible to compare the voxels of the same coordinates because of difficulty in aligning or registering all the coordinates of tissue cells between a pre-image and a post-image.

Conventional digital breast tomosynthesis (DBT), which is the closest to three-dimensional imaging and has relatively few clinical and physical limitations, also requires compression of the breast. However, various factors such as the intensity, direction, reaction, elasticity, gravity, and overlap of the compression are simultaneously applied to each voxel, and thus each voxel does not always have constant coordinates every time when it is taken as an image, thereby making it difficult to match the coordinates of each voxel in the images before and on the date of the image taking. Accordingly, it is difficult to know the changes in the units of tissue cells at each coordinate.

In other words, all the imaging diagnostic apparatuses except the breast computed tomography apparatus 100 according to the disclosure have clinical or physical limitations or are structurally difficult to match the entire coordinates of each voxel between a pre-image and a post-image, thereby making it difficult to obtain the parenchymal value of detailed changes in voxels, i.e., tissue cells, and causing difficulties in desired early detection, accurate diagnosis, and follow-up and management In other words, it is very important how data is reliable and how accurate and specific information is provided in a medical environment where comprehensive diagnostic results are directly related to life. If parenchymal data having no clinical or physical limitations is not provided in a reliable and consistent manner, it is quite difficult to realize the necessary functions such as early detection, accurate diagnosis, tracking, observation and management, and the use of AI to complement the necessary functions is limited. Accordingly, it is necessary to provide definitive and reliable data specific to breast cancer.

Therefore, the breast computed tomography apparatus, which can provide an isotropic 3D image for the diagnosis of the breast, has a structure where the breast can be positioned by only gravity, which is always constant regardless of time and place, because no external force such as compression is applied. Thus, if the same image taking conditions are given to the subject positioned at the same angle, the breast images are always obtained in almost the same form, thereby making it easy to match the entire coordinates of the voxels in the images before and on the reference date of the image taking.

The disclosure is to realize and utilize information about changes in tissue cell units of the breast without any clinical or physical limitations, for very fast lesion detection, accurate early diagnosis, tracking and observation of the progress of breast cancer, and the establishment of a management system. In addition, in order to solve the problems and limitations of the current AI, which has uncertainty due to the batch application of AI to uncertain and inconsistent information or data and the learning of data greatly affected by confounding variables, the above technology specialized in diagnosing the breast cancer can be applied to provide the parenchymal change value in consistent units of tissue cells, thereby overcoming the clinical, scientific, technical limitations and lack of infrastructure of the current AI.

In the actual process of generating the information by the software based on the computer controlling the foregoing gantry and the entire apparatus, the control console for allowing an operator to make inputs, and instructions of the computer, the rotary gear of the gantry is rotated; the X-rays transmitted through the subject are received in the X-ray detector symmetrical to and rotating with the X-ray tube; data is collected in the data collector and transmitted to the image reconstructor; and voxel values are calculated for each image based on the received data, transmitted to the image display, and displayed as an image. Thus, the breast computed tomography apparatus performing this process obtains almost the same breast form between a pre-image and a post-image as long as the same image taking conditions (KV, mA, and Sec) are given to the same angle of the gantry because gravity is constantly exerted regardless of time and places when the breast is positioned for image taking.

In fact, the breast computed tomography apparatus 100 according to the disclosure obtains almost the same breast form in the images before and on the reference date of the image taking regardless of time and place as long as the angle of the gantry 200 is not changed and the image taking conditions (KV, mA, and Sec) are not changed because the subject, i.e., the breast of the same examinee is positioned in the opening 213 by its own weight.

Accordingly, the tomographic images before the reference date and on the reference date, which have been obtained from the breast computed tomography apparatus 100 according to the disclosure, are loaded into hardware (H/W, a work station), and the voxel shift software is used to compare the voxel value (the X-rays attenuation value in units of 'Hounsfield') of the image before the reference date and the voxel value of the image on the reference date, thereby shifting the voxels so that the same values can be matched. After digital subtraction between the voxels in the same position with reference to the image on the reference date, of which the coordinates of the voxels are matched, an unchanged voxel value becomes "0" (or close to "0"), and a changed voxel value (values other than "0") is obtained to be visually emphasized (coloring) or have a specific parenchymal value.

Figure 5:
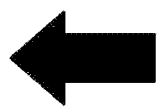

FIG. 5 illustrates the foregoing principle, in which FIG. 5(a) is an image taken before the reference date, and FIG. 5(b) is an image taken on the reference date.

FIG. 5(c) shows a comparison result of voxel values after applying the voxel shift to the image of FIG. 5(b). As shown in FIG. 5(c), if the voxel values before and on the reference date are the same, it is labeled with the number "0", and in other cases, it is labeled with an integer value (including decimal values as necessary) greater or less than "0". By detecting these changes in the voxel value, it is easy and convenient to determine whether the subject is abnormal.

In other words, FIG. 5 illustrates the principle that the H/W (work station) matches the coordinates of the voxels between the images taken before and after the reference date by the voxel shift of shifting the image taken before the reference date of the same examinee loaded from the image information processing system (PACS, not shown) with respect to the image (regarded as the mask) received from the image display 620, and then determines a changed value by the digital subtraction.

Meanwhile, even in the BCT capable of performing the positioning based on only gravity constant regardless of time and place, it is not always easy to match the coordinates of each voxel due to horizontal movement, rotation, enlargement, contraction, new tissue generation, etc. of each tissue cell. In particular, this is true for the three-dimensional BCT, but it is possible to match the voxel values more quickly and accurately by performing a binding voxel shift which moves the voxels in the image taken before the reference date for the mask (post-image) to the X and Y axes (here, the tomographic image becomes two-dimensional with X and Y axes, but these tomographic images become three-dimensional with X, Y, and Z axes when put together).

It takes much processing time to move individual voxels. However, if multiple voxels are bound and moved together, the coordinate matching of these voxels may be processed more quickly. In this case, when the direction and distance (vector) of moving multiple voxel bundles to the matched coordinates (where the voxel bundle value is the average value of the voxels, or the position of the same value by adding all the voxels, or the position of "0" by simultaneous digital subtraction) are given, the result may be obtained more quickly by applying the vector value to each voxel, and the result can be obtained even faster if the voxel movement and digital subtraction are performed simultaneously.

If there is an excessive margin of error in coordinate matching (misalignment or misregistration) due to excessive movement, plastic surgery, feeding, sudden obesity, etc. during the image taking, it may take a significant amount of time to match the coordinates, and thus, in such cases, it may be possible to switch to visual or manual adjustment with a priori knowledge.

In the future, it is expected that AI will be further developed to play an active role, encompassing not only the above functions but also information generation, rather than the current passive role of receiving information and making a diagnosis. Therefore, AI may generate consistent and specific parenchymal values by itself and exceed scientific, technical, and operational limits by itself to provide maximized management by AI that is much more efficient and accurate, so that the doctor can provide more proactive and accurate prognosis and prognosis management to a patient.

Figure 6:
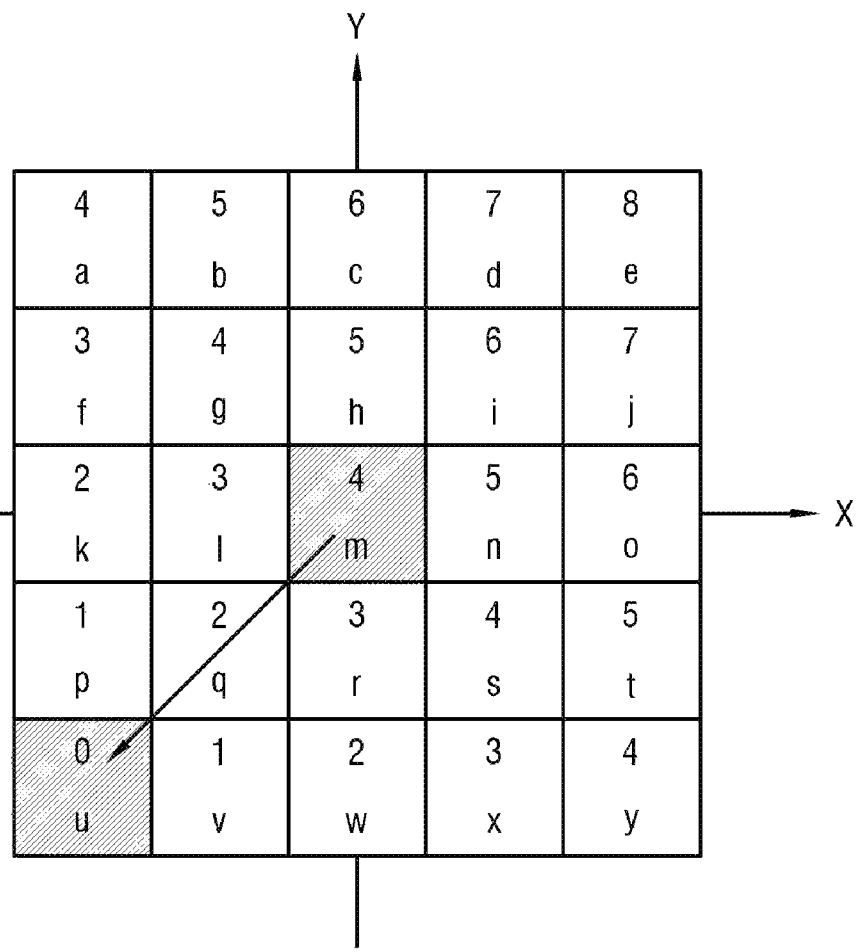

FIG. 6 illustrates a bunch of the voxels for more realistic and faster processing, in addition to FIG. 5. As described above, the processing of the voxels in a bunch is much faster, but too much bunching may result in loss of detail. Therefore, an appropriate bunch of the voxels should be selected.

In FIG. 6, the value of each bundle of the voxels may be used by adding or averaging the values of all the voxels in the bundle. Also, the bundle of the voxels may be voxel-shifted to the same value and digitally subtracted to determine the changed value. Alternatively, both the voxel shift and digital subtraction may be performed simultaneously to calculate the direction and value (i.e., vector value) of the shift to "0" (or closest to "0"), and apply the same vector value to each voxel of the bounded voxels, thereby speeding up the coordinate matching of the voxels while also obtaining the change value.

For the sake of understanding, the description here is based on the simultaneous voxel shift and digital subtraction, and it can be seen that in FIG. 6, the shifting direction and value that becomes "0" in the center is −2 in the X-axis and −2 in the Y-axis, and all the voxels included in the bounded voxel are subjected to the same vector value (X−2, Y−2).

In this case, all the voxel shift and digital subtraction are automatically processed by the software, but it may be done manually as it does not need to be seen in real time all the time. The manual operation may be used for minor calibration processing.

Below, the process of obtaining an image using the breast computed tomography apparatus 100 according to the disclosure and the process of obtaining a change value in each voxel will be described in detail.

First, the examinee takes of clothing from his/her upper body and places his/her breast in the breast opening 213. In this case, the gantry 200 is tilted with respect to the supporter 300 as shown in FIG. 3 and the examinee is stably supported on the supporting unit 320. The image obtained in this case will be the image taken on the reference date.

Here, in order to obtain the same type image of the same patient, it is checked whether the gantry angle and the image taking conditions (KV, mA, Sec, Pulse Rate) are the same as those of the previous image taking before starting the image taking.

The apparatus operator verifies that the subject, i.e., the breast is correctly inserted into the breast opening 213 and makes an image taking instruction through the control console 510. Upon receiving this instruction, the controller 500 activates the X-ray power supply 630 to apply the high voltage to the X-ray tube 230.

At the same time, the controller 500 drives a motor of the rotary gear 220 to rotate the rotary gear 220. This allows the X-ray tube 230 and the X-ray detector 240 to rotate while maintaining a point-symmetric relative position.

The X-ray tube 230, to which the high voltage is applied, is rotated to emit X-rays. The X-rays are emitted in the radial direction as indicated by the bold arrow in FIG. 2. The X-rays are transmitted through the subject, i.e., the breast, and reach X-ray detector 240. The X-rays are converted into electrical signals in the X-ray detector 240 and are aggregated and processed in the data collector 610, transmitted to the outside, reconstructed, and prepared for comparison with the images taken prior to the reference date.

In the H/W (work station), the image taken on the reference date is used as the reference (mask), and the images taken before the reference date of the same patient stored in the PACS is automatically or manually controlled through the binding voxel shift software to match the coordinates of the image taken before the reference date. After the two images are matched, the digital subtraction is performed or both the digital subtraction and the coordinate matching are performed as shown in FIG. 6 to obtain the change value of each voxel. These change values may be visually highlighted (coloring), or the parenchymal change values may be provided as the X-ray attenuation value (in units of Hounsfield units) or provided to the AI.

By providing tissue cell changes from the microscopic stage, it is possible to detect the lesion at the tissue cell level of the breast very quickly and to track and observe the progression of the breast cancer from the microscopic stage, even not immediately. In addition, it has the advantage of being able to start monitoring even if there is only a change in the tissue cells, not after the breast cancer occurs, and it is possible to establish an overall management system for the progression of the breast cancer of all patients from the micro change stage in the tissue cells. Therefore, it is possible to maximize the scope of application by overcoming the limitations of the current technology of AI, which will be used more and more in the future.

The disclosure is not intended to be limited by the foregoing embodiments and the accompanying drawings, as various substitutions, modifications, and changes can be made without departing from the technical ideas of the disclosure by a person having ordinary skill in the art to which the disclosure pertains.

Accordingly, it can also be utilized in similar principle apparatuses such as simulated therapy tomography apparatuses (BCT simulator), tomotherapy apparatuses, etc. and in veterinary CT and extremity & small part CT.

Further, it will be appreciated that the aspects and advantages of the disclosure can be readily realized by the means and combinations thereof disclosed in the appended claims.

The disclosure is to provide a self-shielding and movable gantry and a breast computed tomography apparatus with the same, in which the BCT having many advantages in breast diagnosis as described above can be subminiaturized and generate a low X-ray dose among all X-ray diagnostic apparatuses, and is easy and convenient to shield against the generated X-ray dose.

Further, it is possible to provide a self-shielding and movable gantry and a breast computed tomography apparatus with the same, which can be freely installed or moved to maximize space utilization.

Further, it is possible to provide a self-shielding and movable gantry and a breast computed tomography apparatus with the same, which can be lightweighted and miniaturized to reduce energy consumption and at the same time increase economic efficiency, and can be moved freely to and increase space utilization.

<DESCRIPTION OF REFERENCE NUMERALS>

| | |
|---|---|
| 100: breast computed tomography apparatus | |
| 200: gantry | 210: frame |
| 213: opening | 215: recessed portion |
| 220: rotary gear | 230: X-ray tube |
| 240: X-ray detector | 250: shield |
| 300: supporter | 310: tilting unit |
| 320: supporting unit | 400: transporter |
| 500: controller | 510: control console |
| 610: data collector | 620: image display |
| 630: X-ray power supply | 640: image reconstructor |

What is claimed is:

1. A breast computed tomography apparatus comprising:
a frame shaped like a box and having an interior formed with a space;
a rotary gear rotatably coupled to the interior of the frame;
a low-dose subminiature nano cold-cathode field-emission digital X-ray tube coupled to a first side of the rotary gear and generating X-rays based on high voltage applied thereto;
a perovskite type high-sensitive low-dose X-ray detector coupled to a second side of the rotary gear, receiving the X-rays generated from the X-ray tube and transmitted through a subject, converting the received X-rays into an electrical signal, and transmitting the electric signal to a data collector;
a shield formed on the entire inner surface of the frame except for an opening through which the subject is inserted at one side of the frame, the shield preventing X-rays generated from the X-ray tube from leaking to the outside of the frame;
an image reconstructor configured to reconstruct an image formed by the electrical signal converted by the X-ray detector; and
an image display configured to display the image reconstructed by the image reconstructor,
wherein the rotary gear is movable up and down or left and right with respect to the frame,
wherein the X-ray tube and the X-ray detector are disposed symmetrically with respect to a rotational center axis line to maintain a relative position therebetween, and
wherein the frame comprises an opening on the second side thereof to insert the subject therein, and the frame comprises a shield on an entire inner surface thereof to shield against the X-rays generated by the X-ray tube,
wherein the image reconstructor pixel-shifts a previous image captured before an image taking date relative to an image captured on the image taking date, calculates a change in pixel value between the two images through digital subtraction at corresponding pixels, and reconstructs an image in which the calculated change is reflected for each pixel.

2. The breast computed tomography apparatus of claim 1, wherein the shield comprises a lead plate.

3. The breast computed tomography apparatus of claim 1, wherein the subject comprises a breast.

4. The breast computed tomography apparatus of claim 1, wherein
the frame comprises a tilting structure tilting with respect to a horizontal plane,
the frame couples with a supporting unit for supporting a human body comprising the subject such that the subject in the opening can be maintained downwardly by the subject's own weight.

5. The breast computed tomography apparatus of claim 1, further comprising a transporter comprising wheels on a lower side of the frame such that the frame can move.

6. The breast computed tomography apparatus of claim 1, wherein the image reconstructor, when the image is a three-dimensional image, groups voxels, which are three-dimensional pixels, into a plurality of bundles, pixel-shifts the central voxel of the image formed by the voxel bundles to a voxel having a voxel value of zero, calculates a change in voxel value through digital subtraction, and reconstructs an image in which the calculated change is reflected for each voxel.

7. The breast computed tomography apparatus of claim 1, wherein the X-ray detector includes a plurality of holes configured to respectively guide X-rays emitted from the X-ray tube and passing through the object to be inspected, and a plurality of detectors respectively corresponding to the plurality of holes and configured to detect X-rays received through the respective holes,
wherein each of the detectors is made of a semiconductor, and the plurality of detectors correspond to respective pixels of the image.

8. The breast computed tomography apparatus of claim 7, wherein an amount of X-rays detected by the plurality of detectors corresponds to pixel values of respective pixels of the image.

9. The breast computed tomography apparatus of claim 1, wherein the image reconstructor emphasizes pixels with changes by displaying them in color (coloring) in the image in which the calculated change is reflected for each pixel.

* * * * *